Aug. 3, 1943.  O. STEINER  2,326,077
HIGH-SPEED BETWEEN-THE-LENS PHOTOGRAPHIC SHUTTER
Filed June 17, 1941  4 Sheets-Sheet 3
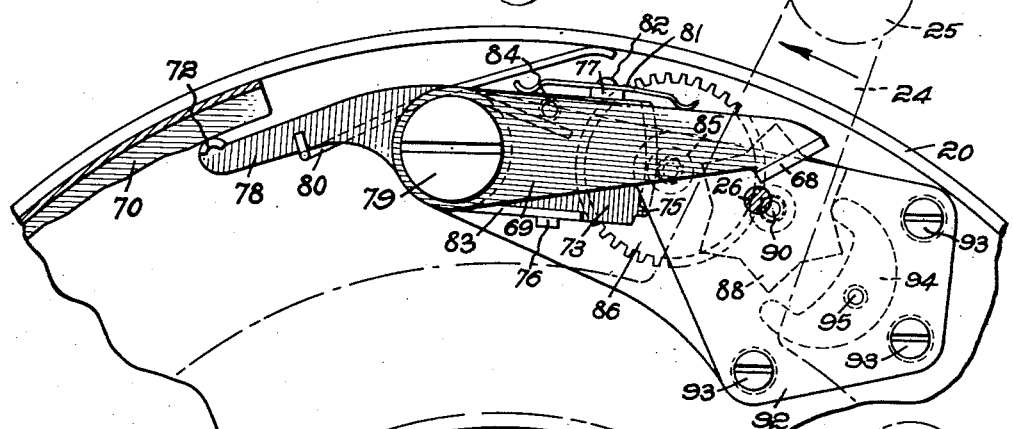
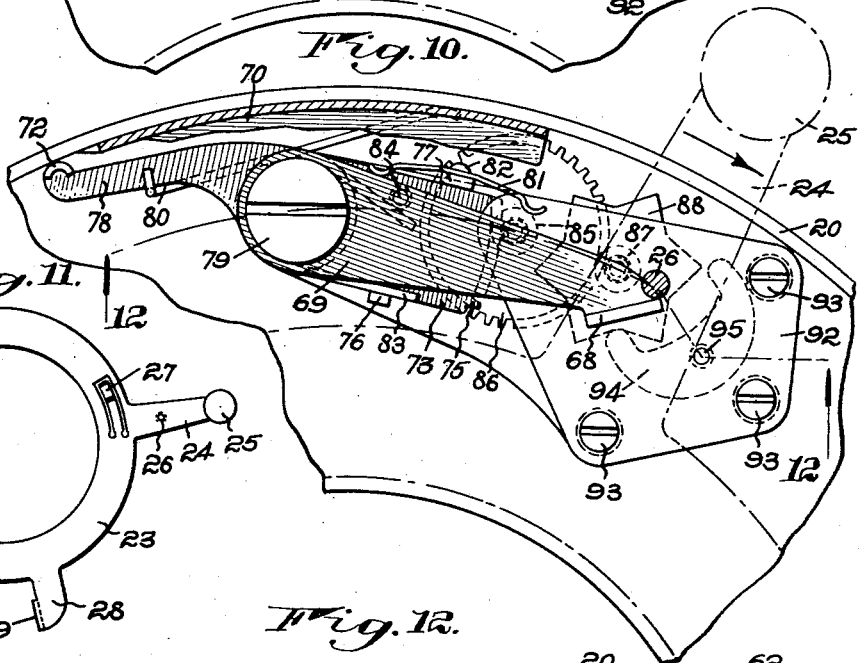
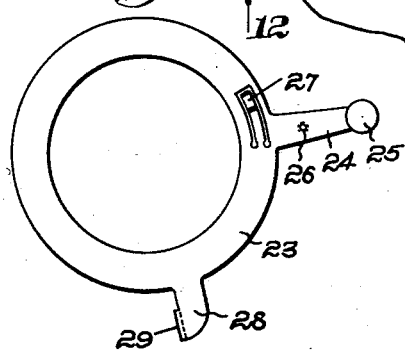
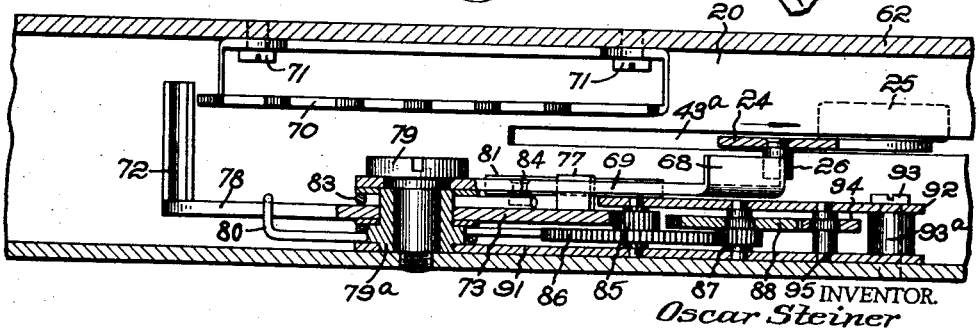
INVENTOR.
Oscar Steiner
BY his Attorneys Aug. 3, 1943.   O. STEINER   2,326,077
HIGH-SPEED BETWEEN-THE-LENS PHOTOGRAPHIC SHUTTER
Filed June 17, 1941   4 Sheets-Sheet 4
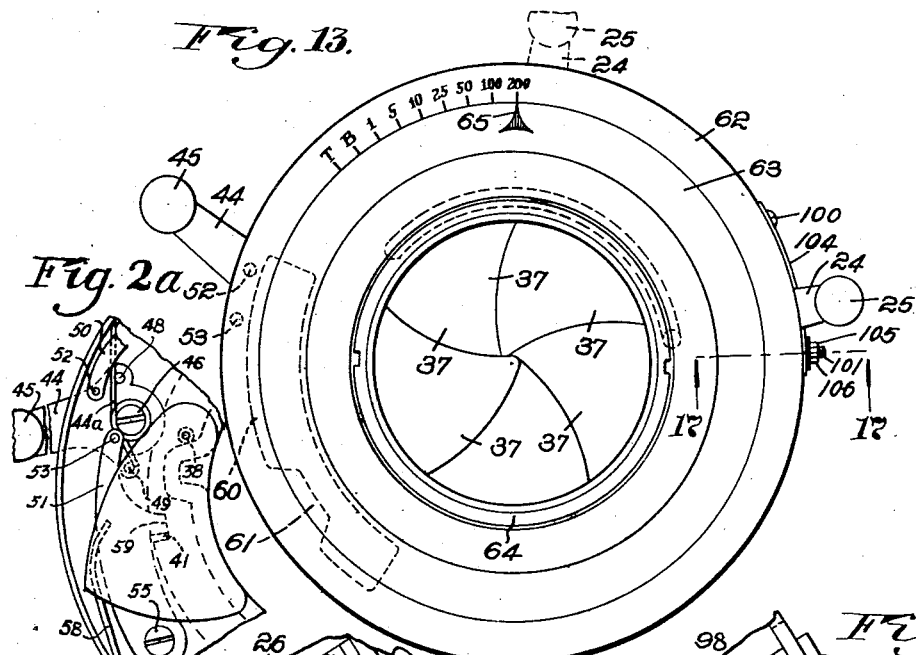
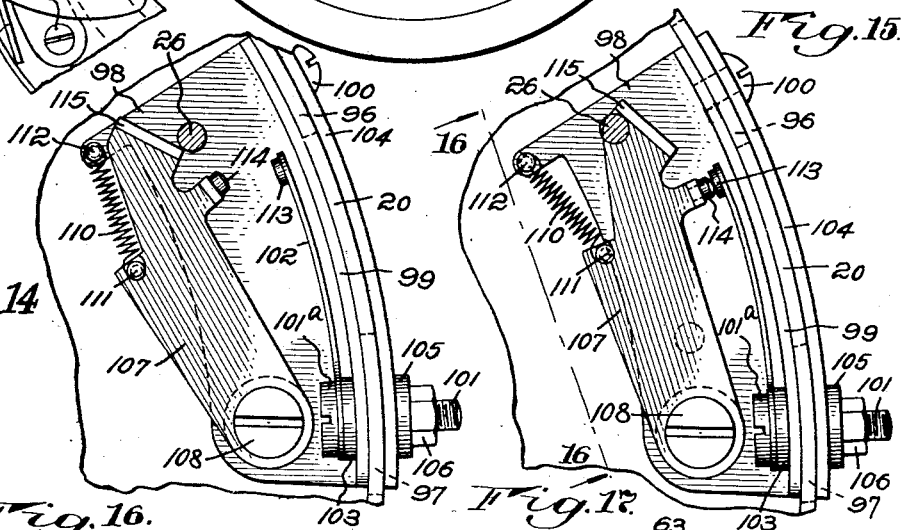
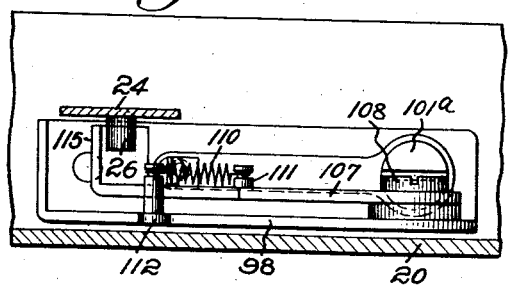
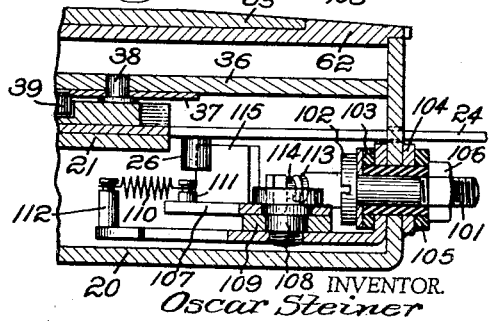
INVENTOR.
Oscar Steiner
BY
his Attorneys Patented Aug. 3, 1943

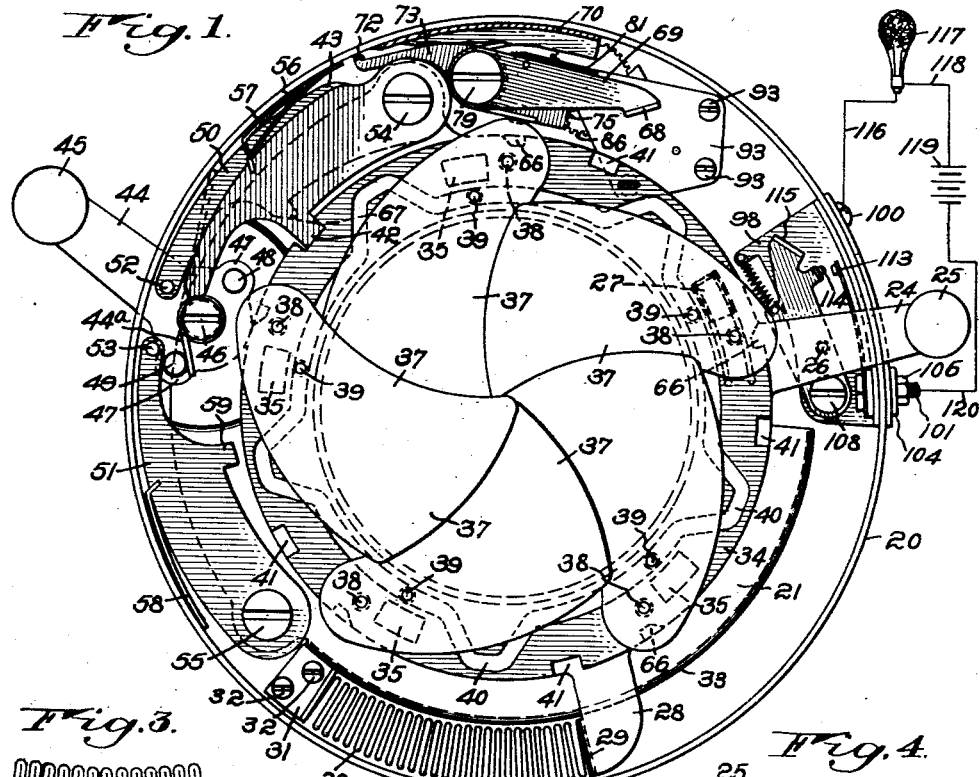
Aug. 3, 1943.   O. STEINER   2,326,077
HIGH-SPEED BETWEEN-THE-LENS PHOTOGRAPHIC SHUTTER
Filed June 17, 1941   4 Sheets-Sheet 1
INVENTOR.
Oscar Steiner
his Attorneys

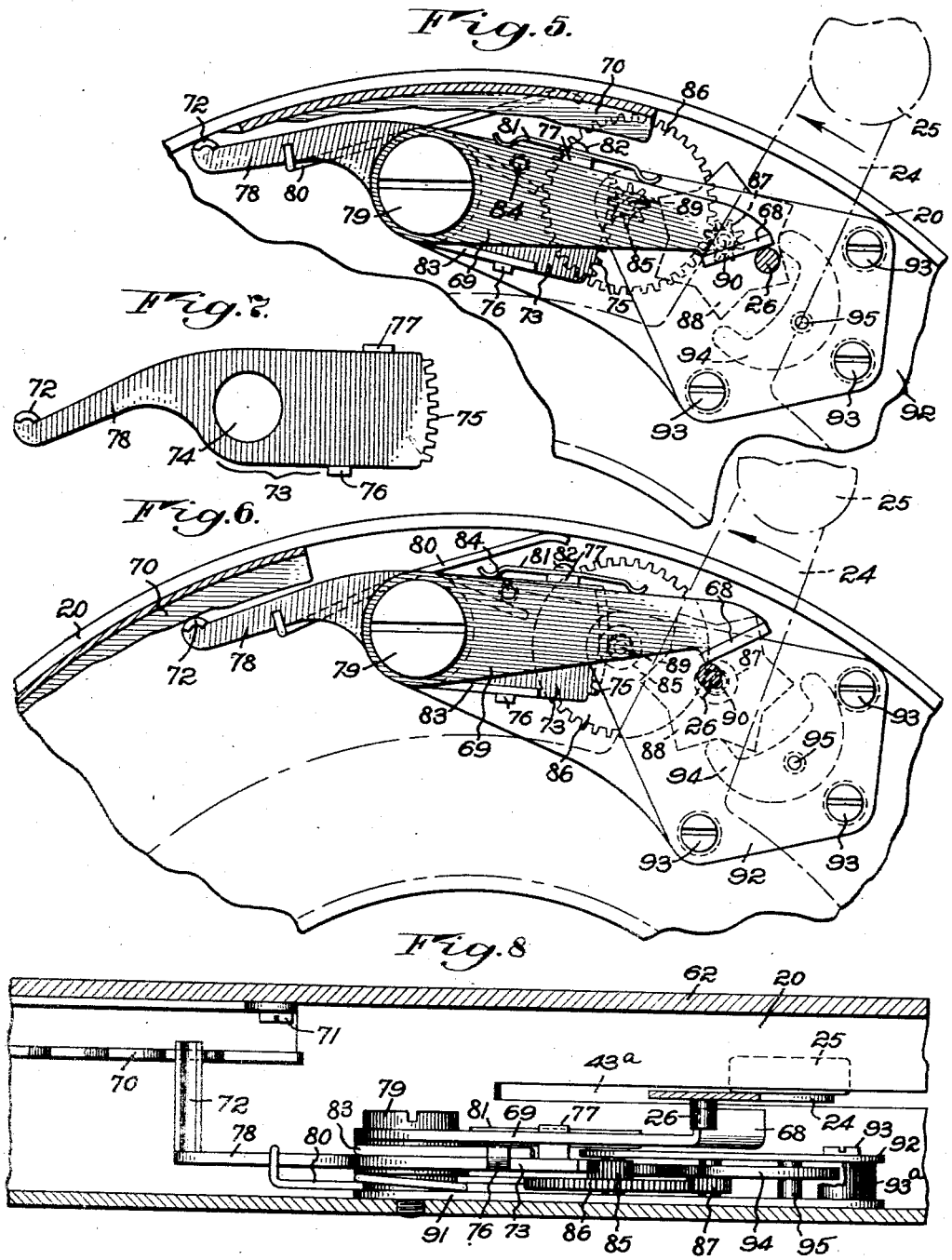

2,326,077

UNITED STATES PATENT OFFICE 2,326,077

HIGH-SPEED BETWEEN-THE-LENS PHOTOGRAPHIC SHUTTER

Oscar Steiner, Rochester, N. Y., assignor to The Folmer Graflex Corporation, Rochester, N. Y., a corporation of Delaware Application June 17, 1941, Serial No. 398,413

16 Claims. (Cl. 95—63)

This invention relates to a new, improved, photographic shutter of the high-speed between-the-lens type having built therein electrical circuit contact means and retarding means, the shutter being desirably substantially the same in certain respects as the shutter disclosed in my co-pending application Ser. No. 368,011, filed November 20, 1940, now Patent No. 2,269,400, dated January 6, 1942, into and to which I have hereby incorporated and added certain improvements.

In order that the principle of the invention may be readily understood, I have disclosed a single embodiment thereof in the accompanying drawings, wherein Fig. 1 is a front elevation of the shutter, the aperture setting plate and the leaf support plate being removed to show the construction of the shutter operating mechanism, the shutter leaves being shown in closed condition and the shutter reset in the set or cocked position;

Fig. 2 is a similar view, but with the shutter release lever shown as depressed and the shutter leaves in the full open condition;

Fig. 2a is a partial detail of the structure shown in Fig. 2;

Fig. 3 is a fragmentary detail of the shutter operating spring in a compressed condition;

Fig. 4 is a view similar to Fig. 3, but showing a fragmentary portion of the shutter operating spring in an expanded condition;

Fig. 5 is a fragmentary detail of Fig. 1, but showing the retarding mechanism, the shutter leaves being in open condition and the shutter operating ring retarded by the retarding mechanism;

Fig. 6 is a view similar to Fig. 5, but showing the shutter operating ring as about to be released by the shutter retarding mechanism, thus allowing the shutter leaves to be closed;

Fig. 7 is an enlarged detail of the shutter retarding mechanism gear sector;

Fig. 8 is a side elevation, partly in section, of Fig. 6;

Fig. 9 is a view similar to Figs. 5 and 6, but wherein the retarding mechanism is positioned by the speed setting ring or dial so as to be inoperative;

Fig. 10 is a view similar to Fig. 6, but wherein the shutter operating ring is shown as being reset, and the operating mechanism is shown as restored for a second exposure;

Fig. 11 is a detail in elevation of the shutter setting drive ring;

Fig. 12 is a transverse section through Fig. 10 on the line 12—12 thereof;

Fig. 13 is a front elevation of the shutter, showing the inter-relation of the operating levers when the shutter is in the set condition, the shutter reset lever being shown in run-down condition in dotted lines;

Fig. 14 is an enlarged detail of Fig. 1, showing the position of the electrical contacting means while the shutter operating ring is being reset;

Fig. 15 is a detail view similar to Fig. 14, but wherein the contacts have been closed by the operating ring when traveling in a shutter-operating direction;

Fig. 16 is a vertical section through Fig. 15 on the line 16—16 thereof; and

Fig. 17 is a vertical section through Fig. 13 on the line 17—17 thereof.

Important objects of this invention are to provide a shutter of simple construction, yet very accurate in its function, and wherein the shutter leaves can be very rapidly opened and closed without undue wear on the operating parts; and to provide a shutter having built therein very accurate timing mechanism of simple construction that will permit very accurate timing of the so-called slow shutter speeds.

In order to secure these and other important objects of my invention, I may employ other embodiments thereof than that herein shown, to which, therefore, my invention is not limited.

The shutter herein illustrated is desirably of the high-speed between-the-lens type disclosed in my said copending application Ser. No. 368,011, now Patent No. 2,269,400, dated January 6, 1942, and with respect to instantaneous speed and time and bulb exposures the shutter herein disclosed operates substantially the same as that disclosed in my said patent. I have, however, made certain changes and improvements in the structure in order to obtain control over the instantaneous speeds and also over the so-called slow shutter speeds. I have also added novel contacting means for completing an electrical circuit through a flash bulb or other device.

Referring first particularly to Figs. 1 and 2, but also to certain figures of details, such as Figs. 11, 13 and 17, I have in Figs. 1 and 2 represented the shutter housing at 20, it desirably being of the usual structure having a projecting cylindrical portion to receive the rear element of the photographic lens (not shown), which needs no further amplification of description herein. Attached to the said shutter housing 20 is a shutter mechanism plate 21, shown in Fig. 1 and in section in part in Fig. 17. It is held in spaced relation to the bottom of the shutter housing 20 in any well known manner as by spacing studs or washers. The said mechanism plate 21 is provided with a cylindrical boss 22 (Fig. 2) protruding therefrom and into which the usual front element of the photographic lens is attached. Fitted over the said protruding boss 22 and resting on the shutter mechanism plate 21 is a shutter operating ring 23, shown separately and most clearly in Fig. 11. It is provided with a reset lever 24 having a reset knob 25, and with a synchronizer and slow-shutter-speed operating pin 26, a latch or pawl 27, and a radially extending arm 28 having a downturned portion 29 for engaging an operating spring 30, which, while it may be of any suitable type, is here shown of the structure most apparent in Fig. 4. I may employ an ordinary helical spring for the purpose, but inasmuch as certain advantages obtain or result from the use of the operating spring 30 herein shown, I desire to claim the same in its novel relation but without in any way limiting my invention to the use of the said spring 30 excepting in so far as the same is definitely claimed in a claim or claims herein.

The said operating spring 30 is backed up by an angle plate 31 secured to the shutter housing 20 by means of screws 32, 32. The periphery of the said shutter mechanism plate 21 provides an edge that is turned over, as indicated at 33, to form a support for the said operating spring 30. Also fitted over the said cylindrical boss 22 and overlying the shutter operating ring 23 is a shutter leaf cam ring 34 provided with a series of spaced, circumferentially arranged openings 35, 35 engaged in turn by the pawl 27 of the shutter operating ring 23. Fitted over the said cylindrical boss 22 and spaced from the shutter mechanism plate 21 is a shutter leaf support plate 36, shown most clearly in Fig. 17, and which has attached thereto shutter leaves 37, 37, by means of shoulder rivets 38, 38, on which said shutter leaves are free to pivot. Said shutter leaves 37, 37 are also provided with short studs or dowels 39, 39 which ride in an encircling cam path 40 of the shutter leaf cam ring 34.

It will be apparent that if the shutter leaf cam ring 34 is caused to rotate in one direction, the said dowels 39, 39 will follow the said cam path 40, thus causing said shutter leaves 37, 37 to be reciprocatingly or oscillatingly opened and closed. As previously stated, the shutter operating ring 23 has integral therewith the pawl 27 which will in operation successively engage the openings 35, 35, of the shutter leaf cam ring 34 when the shutter operating ring 23 is turned in a contraclockwise direction, and if said shutter operating ring 23 is caused to move in a contraclockwise direction a distance equal to the spacing of the openings 35, 35, the said shutter leaves 37, 37 will be caused to open fully and to close, thus effecting an exposure.

On the outer face or periphery of the shutter leaf cam ring 34 is provided a series of rectangular notches 41, 41 engaged by a release pawl 42 of a shutter operating lever 43. When the shutter is reset by the turning of shutter reset lever 24 in a clockwise direction, thus compressing the operating spring 30, the said driving dog 27 of the shutter operating ring 23 will be turned in a clockwise direction, thus engaging a new opening 35 of the shutter leaf cam ring 34. When the release pawl 42 is withdrawn from the notch 41 which it engages, the shutter leaf cam ring 34 will be driven in a contraclockwise direction under the influence of the said operating spring 30, and the driving pawl 27 of the shutter operating ring 23, until stopped by the reset lever 24 when it reaches the end of its travel in a slot 43a (Fig. 8) provided therefor in the periphery of the shutter housing 20. A new opening will now be engaged by the release pawl 42. Thus, when the shutter reset lever 24 is turned in a clockwise direction, the shutter leaf cam ring 34 will be held stationary by reason of the fact that the release pawl 42 engages a notch 41, and the pawl 27 of the shutter operating ring 23 will engage a new opening 35 when the shutter reset lever 24 reaches the end of its travel in a clockwise direction and is stopped from further travel by the end of the slot 43a provided therefor in the periphery of the shutter housing 20. The shutter will now be in the condition shown in Fig. 1. It will be evident from the description thus far given that I have provided simple means for obtaining an instantaneous exposure.

In Fig. 2, the shutter leaves 37 are shown in a fully opened condition, the dowels 39 having respectively ridden to the outermost positions in the cam formations 40. As the said shutter leaf cam ring 34 continues to travel in one direction, the said dowels 49 will be moved in an inward direction toward the center of the shutter, thus closing the shutter leaves 37, 37.

In order to control the shutter operating lever 43, I have provided a shutter release lever 44 having a knob 45. The said lever 44 is pivoted to the shutter mechanism plate 21 in a recess provided therefor, by reason of a shoulder screw 46. At the pivoted end of the shutter release lever 44, there are provided two laterally extending bosses 47, 47 having pins 48, 49 respectively. Engaging the pin 49, wrapped about the shoulder screw 46 and engaging the shutter housing 20, is a spring 44a for the purpose of causing the said shutter release lever 44 to be turned in a clockwise direction.

In order to provide time and bulb exposures, I have provided two additional shutter operating lever arms 50 and 51 respectively, the former being provided with a pin 52 and the latter with a pin 53. The shutter operating lever arms 43 and 50, the latter being the time exposure operating lever arm just referred to, are attached to the shutter mechanism plate 21 by a shoulder screw 54, and the bulb exposure shutter operating lever arm 51 is attached to the said shutter mechanism plate 21 by a shoulder screw 55. The said shutter operating lever 43 is caused to turn in a contraclockwise direction under the influence of a spring 56, and the time-exposure shutter-operating lever-arm 50 is caused to turn in a contraclockwise direction by means of a spring 57. The bulb-exposure shutter operating lever arm 51 is caused to turn in a clockwise direction by a spring 58. The shutter operating lever 43 and its associated release pawl 42 are provided for instantaneous exposure, whereas to secure a bulb exposure the said second lever arm 51 is employed, as will be described.

When the shutter release lever 44 is turned in a contraclockwise direction, the release pawl 42 will be disengaged from its notch 41 under the influence of the pin 48 coacting with the shutter operating lever 43. At the same time, the bulb exposure shutter operating lever arm 51 having a pawl 59, will be allowed to turn in a clockwise direction under the influence of spring 58 inasmuch as the pin 49 will be removed from engagement with the said bulb exposure shutter operating lever arm 51. As the release pawl 42 is withdrawn from the notch 41, the shutter leaf cam ring 34 will start turning in a contraclockwise direction, but when the notch 41 reaches the pawl 59 and is engaged thereby, the said shutter leaf cam ring 34 will be stopped from further movement. The shutter leaves 37 will then be in the fully opened condition shown in Fig. 2, the engagement of the pawl 59 on the lever arm 51 with the notch 41 being shown in Fig. 2a. When the shutter release lever 44 is released, its spring 44a will cause said release lever 44 to turn in a clockwise direction, carrying with it the pin 49, which will engage the bulb exposure shutter operating lever arm 51, thus withdrawing the pawl 59 from the notch 41 and allowing the shutter leaf cam ring 34 to continue turning in a contraclockwise direction until the limit of motion is reached, at which time the shutter leaves 37 will again be in closed condition and the release pawl 42 will engage a new notch 41.

During this operation the time exposure shutter operating lever arm 50 was held out of action by means of a cam plate 60 having a notch 61 that is most clearly shown in dotted lines in Fig. 13. The said cam plate 60 is attached to a shutter setting ring 62 which is fitted to the shutter housing 20, and is held in place by means of an index ring 63 and a locking nut 64 threaded to the centrally extending cylindrical boss 22.

When making bulb exposures, "B" on the index ring 62 is aligned with the index 65, and the notch 61 of the cam plate 60 will be moved into position to hold the time exposure operating lever arm 50 in inoperative condition, but allowing the bulb exposure operating lever arm 51 to operate.

In order to provide a time exposure, a second series of notches 66, 66 is provided in the shutter leaf cam ring 34, said notches being narrower in width than notches 41, 41 so that the former will not be engaged by release pawl 42 or pawl 59, but will be engaged by a pawl 67 of the time exposure operating lever arm 50. When the shutter setting ring 62 is turned so that "T" will be aligned with index 65, the notch 61 of the cam plate 60 will be in position to allow both the time exposure operating lever arm 50 and the bulb exposure operating lever arm 51 to operate.

Assuming that the shutter is in the set condition shown in Fig. 1, the shutter release lever 44 is turned in a contraclockwise direction, thus withdrawing the pawls 42 and 67 from engaging with notch 41, and the shutter leaf cam ring 34 will turn in a contraclockwise direction until a notch 41 is engaged by the pawl 59 of the bulb exposure operating lever arm 51. When the shutter release lever 44 is allowed to turn in a clockwise direction under the influence of the said spring 44a, the pawl 59 of the bulb exposure operating lever 51 will be withdrawn from the notch 41, and a notch 66 of the shutter leaf cam ring 34 will be engaged by the pawl 67 of the time exposure operating lever arm 50. The shutter leaf cam ring 34 will be held in this position which corresponds to the full open position shown in Fig. 2, until the shutter release lever 44 is again operated in a contraclockwise direction, thus withdrawing the said pawl 67 from a notch 66 and allowing the shutter leaf cam ring 34 to continue turning in a clockwise direction until the reset lever 24 reaches the limit of its travel, at which time the shutter leaves 37 will be in closed position.

The description of the operation of the shutter thus far given is substantially the same as of the shutter operation in my said Patent No. 2,269,400.

To provide means for controlling shutter speeds other than the fastest instantaneous speed, I have provided retarding means that will accurately time the so-called instantaneous speeds from one second upward to the limit of the most rapid instantaneous speed available. This speed will depend somewhat upon the shutter size, or the size of the lens accommodated. In the smaller sizes, a top speed of $\frac{1}{500}$ of a second has been obtained and even on the very large sizes a speed of $\frac{1}{200}$ of a second has readily been obtained.

Referring now to Figs. 5 to 12, the shutter reset lever 24 has attached thereto, as previously stated, the operating pin 26 which will be engaged by the upturned face 68 of the retarding lever 69. In Fig. 5, is shown a speed cam 70 attached to the shutter setting ring 62 by means of screws 71, 71, as most clearly shown in Figs. 8 and 12. In Fig. 5 the shutter setting ring 62 is assumed to be in a position wherein the numeral "1" corresponding to one second will be aligned with the index 65 of Fig. 13. This provides for the longest delayed exposures. As the shutter setting ring 62 is turned in a contraclockwise or clockwise direction, varying portions of the surface of the speed cam 70 will be engaged by a shoe 72 of a gear sector 73 separately shown in Fig. 7. For example, in Fig. 6, the shoe 72 is engaged with a portion of the speed cam 70 corresponding to the numeral "100" of the shutter setting ring 62, and in Fig. 9, the said shoe 72 will be on a portion of the speed cam 70 corresponding to $\frac{1}{200}$ of a second on the setting ring 62. The relation of the said speed cam 70 to the shutter setting ring 62 will be set forth more fully subsequently herein.

The said gear sector 73 is provided, as best shown in Fig. 7, with a pivot hole 74, terminal gear teeth 75, an upturned formation 76, a second, opposite, upturned formation 77 and a lengthwise extending arm 78 on which is formed the said cam shoe 72. The said gear sector 73 is attached to the shutter housing 20 by means of a shoulder screw 79 passing through a spacing bushing 79a. Overlying the said gear sector 73 is the retarding lever 69, pivoted on said shoulder screw 79. The said gear sector 73 is caused to turn in a clockwise direction by a spring 80 which engages the arm 78 of the said gear sector 73, and is fitted around the bushing 79a, as shown in Fig. 12, and engages the inner wall of the shutter housing 20. Attached to the upwardly extending formation 77 of the gear sector 73 is a spring bumper 81, by means of a rivet 82, and engaging the upwardly extending formation 76 of the gear sector 73 is a spring 83 wound about said bushing 79a and engaging a pin 84 of the retarding lever 69. The said spring 83 tends to hold the retarding lever 69 in engagement with said spring 81.

Meshing with the gear teeth 75 of the gear sector 73 is a pinion 85 attached to a large gear 86 that in turn meshes with a pinion 87 of a star wheel 88. The said pinions 85 and 87 are provided with shafts 89, 90 respectively, which engage holes (not shown) in the slow-shutter-speed mechanism support plate 91, best shown in Fig. 8. The shoulder screw 79 passes through the said mechanism support plate 91 and is threaded into the shutter housing 20. The upper ends of the shafts 89 and 90 are supported by a plate 92, shown in Fig. 12 as held to the shutter housing 20 by screws 93, 93, passing through a bushing 93a, and through the said slow-shutter-speed mechanism support plate 91, and are threaded into the shutter housing 20.

Engaging the edge or periphery of the star wheel 88 is an escapement 94 mounted on a shaft 95 that is supported by the said plates 91 and 92. When the retarding lever 69 is caused to move in a contraclockwise direction under the influence of the operating pin 26, the reset lever 24, the retarding lever 69 with its upturned face 68, and the gear sector 73, will be caused to turn in a contraclockwise direction by reason of the engagement of the retarding lever 69 by said upturned formation 77. At the same time, the pinion 85 and the gear 86 will be caused to turn in a clockwise direction and the pinion 87 and the star wheel 88 will be caused to turn in a contraclockwise direction past the escapement 94 until the upturned face 68 of retarding lever 69 will clear the operating pin 26, thus allowing the shutter operating ring 23 and the reset lever 24 to continue to travel until they reach the limit of their motion, that is, the retarding mechanism delays the action of the reset lever 24.

In Fig. 5, the speed cam 70 is shown in a position to allow the fullest travel of the gear sector 73, and thus the greatest amount of retardation will take place, such retardation occurring while the shutter leaves 37, 37 are in open condition. This will correspond with the one-second setting of the shutter setting ring 62. If said setting ring 62 is moved to a position corresponding to 1/100 of a second, the speed cam 70 will be in the position shown in Fig. 6.

In such case the operating pin 26 of the reset lever 24 will cause the retarding lever 69 to be turned in a contraclockwise direction until the condition or position of parts is reached shown in Fig. 6, wherein the spring 81 will be substantially flattened out and the upturned end 77 of the gear sector 73 will be engaged by the retarding lever 69, allowing the operating pin 26 to pass the face 68 of the retarding lever 69. The position is such that no actual movement of the gear 86 and the star wheel 88 takes place, but a slight retarding action is imparted by the spring 81. When the shutter setting ring 62 is adjusted to the position shown in Fig. 13, the gear sector 73 will be in the position shown in Fig. 9. The upturned face 68 of the retarding lever 69 will be entirely removed from the path of the operating pin 26 of the reset lever 24 and thus no retarding action will take place.

It will be understood from the foregoing description that any degree of retardation can be obtained merely by the act of positioning the speed cam 70 in relation to the shoe 72, so as to cause a varying degree of travel of the gear sector 73, which in turn will cause the gear 86 to be moved a corresponding part of a revolution and the star wheel 88 will also have its rotation varied in the same ratio. In this manner any predetermined shutter speed can be obtained.

When resetting the shutter herein described, the operating pin 26 will engage the back surface of the upturned face 68 of the retarding lever 69 and will cause said retarding lever 69 to be moved in a clockwise direction until said upturned face 68 is passed by the operating pin 26 and against the spring 83. Thus no turning movement will be transmitted to the gear sector 73.

Referring now to Figs. 13 to 17 and also to Figs. 1 and 2, I have in this embodiment of the invention also provided means for closing contact of an electrical circuit for completing the circuit through a flash lamp or other device, and I will now disclose the preferred means for accomplishing this, but to which disclosed means my invention is not limited.

The shutter housing 20 is provided with two elongated slots or openings 96 and 97, shown in Fig. 15, for the purpose of mounting a contact base member 98, shown as made up of an L-shaped part having one edge, as indicated at 99, turned up and formed to fit the inner surface of the shutter housing 20. The said contact base member 98 is attached to the shutter housing 20 by a screw 100 and by a bolt 101 provided with a head 101a. The said bolt 101 passes through a contact spring 102, also through an insulating bushing 103, through the said shutter housing slot 97, through a cover plate 104 and an insulating washer 105, and it is clamped in position by a nut 106. Pivoted to the said contact base member 98 is a contact rocker arm 107 by means of a shoulder screw 108, and it is separated from said contact base member 98 by a washer 109. The said rocker arm 107 is caused to move in a contraclockwise direction under the influence of a coiled spring 110, one end of which is attached to a pin 111 of the rocker arm 107, and to the pin 112 of the contact base member 98. The pins 111 and 112 are so positioned that when the said rocker arm 107 reaches a position wherein the centers of the said pins 111 and 112 and of the shoulder screw 108 are in alignment, no motion will be imparted to the rocker arm 107 by the said spring 110.

When the shutter is in the set position shown in Fig. 1, the contacts 113 and 114 will be in open position. As the shutter is released and the shutter operating ring 23 is set in motion, carrying with it the reset lever 24 and the operating pin 26, said operating pin 26 will engage an upturned face 115 of the said contact rocker arm 107. As the said operating pin 26 passes the said upturned face 115, the contact rocker arm 107 will be caused to turn in a clockwise direction, carrying with it the contact 114 which will touch contact 113, and as the said operating pin 26 continues to travel in a contraclockwise direction, the said operating pin 26 will leave the upturned face 115, thus allowing the contacts 113 and 114 again to be restored to open condition by the spring 110.

As the shutter is reset by turning the reset lever 24 in a clockwise direction, the operating pin 26 will engage the opposite surface of the upturned face 115, causing said contact rocker arm 107 to be moved in a contraclockwise direction against the spring 110, thus allowing said operating pin 26 to be restored to the set condition shown in Fig. 1, without closing the contacts 113 and 114. Such structure is necessary to prevent inadvertent flashing of a flash-bulb if placed in the circuit prior to resetting the shutter.

The usual circuit of a flash-bulb and battery is shown in Fig. 1, wherein one wire 115 is shown as grounded to the screw 100. The said wire 116 also contacts with one side of a flash bulb 117. A second wire 118 is connected to the other terminal of the said flash bulb 117 and then to a battery 119 and through a wire 120 to the screw 101 and contact member 102, through contacts 113 and 114, then through contact base member 98 to the screw 100.

The flash synchronizer mechanism herein disclosed can be readily adjusted to time the delay between contact and the actual flashing of the bulb within any requirements set up by flash bulbs as now manufactured. The shutter herein disclosed is so constructed as to have considerable delay from the time the shutter release lever 44 is operated and the time the shutter leaves 37 actually open. This is accomplished by the cam path spacing shown in Figs. 1 and 2 and hereinbefore fully described. It will be understood from the disclosure that the shutter leaf cam ring 34 travels a considerable distance before the dowels 39 are reached by the cam track variation for imparting a reciprocatory opening and closing movement to the shutter leaves 37.

The time of the contact with respect to the delay of the flash bulb is accomplished by changing the position of the synchronizer contact base member 98. This is effected by loosening the screw 100 and the nut 106 in the slots 96 and 97 respectively of the shutter housing 20 as provided for that purpose, and then making the necessary change in the position of the contact base member 98, thus adjusting the time of actual contact with respect to the rotation of the shutter leaf cam ring 34. I have demonstrated that an adjustment from five milliseconds to thirty milliseconds between the time of actual contact and the time of the opening of the shutter leaves 37 is readily obtainable.

I have herein disclosed a shutter that is of very strong or rugged construction that is made up of very simple parts and that can readily be assembled by unskilled labor. I have by my present invention provided a shutter capable of very high speed and which can be provided with accurately adjusted intermediate speeds. Because of the herein described structure of the shutter, very simple contacting means is provided that can be accurately and readily adjusted for any time delay desired.

Having thus described one illustrative embodiment of the invention, it is to be understood that although specific terms are employed, they are used in a generic and descriptive sense and not for purposes of limitation, the scope of the invention being set forth in the following claims.

I claim:

1. A between-the-lens photographic shutter having a shutter housing and therein having a series of leaves movable reciprocatingly to and fro to complete a single opening-and-closing act, a cam ring having a continuous cam path including a series of spaced cam formations, means operatively connecting said leaves to said cam path with its said cam formations to impart a to and fro movement of reciprocation to said leaves to complete each single opening-and-closing thereof, operating means to move said cam ring in one direction only thereby to effect by said cam formations all opening and closing movements of said leaves, said last mentioned means being operatively connected to said cam ring to turn it by steps in said one direction only, but at each such turning movement to turn it only to the extent of such part of a complete rotation of said cam ring as is necessary to cause the said shutter leaves to open and then to close in a single, complete, to and fro movement; said operating means having a reset lever-member, shutter-action retarding means for controlling the shutter speeds other than the fastest instantaneous speed, located within said shutter housing in close proximity to said reset lever-member and in advance of the said position thereof, said reset-lever-member having a formation to engage the retarding means in the shutter-leaves-operating direction of movement of said reset lever-member.

2. A combination according to claim 1, but in which means is provided for rendering the said retarding means active or inactive.

3. A combination according to claim 1, but in which a shutter speed-setting ring is provided on the shutter, in close proximity to said retarding means, and having means to engage an element of and thereby control the action of the said retarding means.

4. A combination according to claim 1, but in which the said shutter is provided with time exposure means and with bulb exposure means, and with two shutter operating lever arms co-acting respectively with said time exposure means and said bulb exposure means.

5. A combination according to claim 1, but in which there is provided a shutter release lever having two operating formations, and there are also provided time exposure means and bulb exposure means, each having an arm respectively operated by said operating formations respectively.

6. A between-the-lens photographic shutter having a shutter housing and therein having a series of leaves movable reciprocatingly to and fro to complete a single opening and closing act, a cam ring having a continuous cam path including a series of spaced cam formations, means operatively connecting said leaves to said cam path with its said cam formations to impart a to and fro movement of reciprocation to said leaves to complete each single opening-and-closing thereof, operating means to move said cam ring in one direction only thereof to effect by said cam formations all opening and closing movements of said leaves, said last mentioned means being operatively connected to said cam ring to turn it by steps in said one direction only, but at each such turning movement to turn it only to the extent of such part of a complete rotation of said cam ring as is necessary to cause the said shutter leaves to open and then to close in a single, complete, to and fro movement; said operating means having a reset lever-member, shutter-action retarding means for controlling the shutter speeds other than the fastest instantaneous speed, located within said shutter housing in close proximity to said reset lever-member and in advance of the said position thereof, said reset lever-member having a formation to engage the retarding means in the shutter-leaves-operating direction of movement of said reset lever-member, said reset member having a pin 26 to engage the said retarding means, a shutter setting ring having a speed cam with a varying face formation, and a movable element engaging and moved by said speed cam face and cooperating with said retarding means.

7. A combination according to claim 1, but in which there is provided a movable shutter setting ring having in close proximity to said retarding means and the reset lever-member a speed cam with a varying cam formation, and a lever engaging and moved by said speed cam formation and itself engaging the said retarding means.

8. A between-the-lens photographic shutter having a shutter housing and therein having a series of leaves movable reciprocatingly to and fro to complete a single opening and closing act, a cam ring having a continuous cam path including a series of spaced cam formations, means operatively connecting said leaves to said cam path with its said cam formations to impart a to and fro movement of reciprocation to said leaves to complete each single opening-and-closing thereof, operating means to move said cam ring in one direction only thereof to effect by said cam formations all opening and closing movements of said leaves, said last mentioned means being operatively connected to said cam ring to turn it by steps in said one direction only, but at each such turning movement to turn it only to the extent of such part of a complete rotation of said cam ring as is necessary to cause the said shutter leaves to open and then to close in a single, complete, to and fro movement; said operating means having a reset lever-member, shutter-action retarding means for controlling the shutter speeds other than the fastest instantaneous speed, located within said shutter housing in close proximity to said reset lever-member and in advance of the said position thereof, said reset lever-member having a formation to engage the retarding means in the shutter-leaves-operating direction of movement of said reset lever-member, the shutter retarding means including a retarding lever 69, the shutter reset member being a lever having a pin 26 to engage said retarding lever, and means to move said retarding lever out of the path of movement of said pin 26.

9. A retarding mechanism for the shutter action of a between-the-lens photographic shutter in the casing thereof, comprising a pivotally mounted gear sector 73, a retarding lever 69 pivoted co-axially with said gear sector, a shutter setting ring 62 mounted upon the shutter casing and encircling the shutter and the shutter operating means, and adapted to be circumferentially adjusted thereabout, a speed cam 70 carried at the inner face of said shutter setting ring, within said shutter casing, said gear sector having a part positioned to engage the face of said speed cam in the several positions of circumferential adjustment of said speed cam, said shutter having a reset lever provided with a formation to engage and move said retarding lever, and retard-means gearing and escapement actuated by the said movement of said retarding lever.

10. A combination according to claim 9, but in which there is provided means to move the said retarding lever out of the path of movement of the said formation on the said reset lever.

11. A combination according to claim 9, but in which the said retarding lever is provided with a formation 68 and the reset lever is provided with a pin 26 to engage said formation 68 and thereby to move said retarding lever, in which said gear sector is provided with a spring bumper 81 engaged by said retarding lever, and in which there is provided a spring 83 to hold the retarding lever in engagement with said spring bumper 81.

12. A combination according to claim 1, but in which there is provided a shutter operating ring having an operating spring 30 positioned between an extension from said shutter ring and a portion of the shutter casing, said spring 30 consisting of a non-coiled spring band folded transversely back and forth upon itself at a multiplicity of slightly spaced points throughout its length.

13. A retarding mechanism for the shutter action of a between-the-lens photographic shutter in the casing thereof, comprising a pivotally mounted toothed member having a projecting formation, a retarding lever pivotally mounted closely adjacent said toothed member, a shutter setting ring mounted upon the shutter casing to encircle the shutter and the shutter operating means and adapted to be circumferentially adjusted thereabout, a speed cam carried by said shutter setting ring so as to be brought into selected positions of circumferential adjustment by movement of said setting ring, so as to be engaged along its cam formation by said projecting formation of said toothed member or to be moved out of the path of said projecting formation, said shutter having a reset lever-member provided with a formation to engage and move said retarding lever, and retarding-means gearing and escapement actuated by the said movement of said retarding lever.

14. A combination according to claim 13, but wherein said speed cam is movable into a position in which its relation to the projecting formation of the toothed member is such that the retarding lever is out of the path of movement of the formation of the reset lever-member.

15. A combination according to claim 13, but wherein when the speed cam is positioned so that a high cam point thereof contacts with said extending formation of the toothed member, the retarding lever is out of the path of movement of the formation of the reset lever-member and no retardation occurs, and wherein contact of said extending formation with cam points of lesser height on said speed cam increases the said retarding action, and wherein when the speed cam is so positioned that said extending formation does not contact with said speed cam, the greatest amount of retardation occurs.

16. A combination according to claim 13, but wherein the said retarding lever is pivoted co-axially with said toothed member and is provided with a formation 68, and the reset lever-member is provided with a pin 26 to engage said formation 68 and thereby move the retarding lever when permitted to do so by the position of the speed cam.

OSCAR STEINER.